Patented June 17, 1952

2,601,204

UNITED STATES PATENT OFFICE 2,601,204

PROCESS OF LOWERING BLOOD PROTHROMBIN LEVEL AND LENGTHENING CLOTTING TIME WITH METHYLENE-BIS-HYDROXY COUMARIN

Harold A. Campbell, Denville, Mark A. Stahmann, Middleton, and Charles F. Huebner, Summit, N. J., and Karl Paul Link, Madison, Wis., assignors to Wisconsin Alumni Research Foundation, Madison, Wis., a corporation of Wisconsin No Drawing. Continuation of application Serial No. 414,688, October 11, 1941. This application November 15, 1947, Serial No. 786,316

6 Claims. (Cl. 167—65)

Our invention relates to the process of lowering the blood prothrombin level and lengthening the clotting time of the blood in mammals, and thereby combating clotting in vivo.

This application is a continuation of our copending application Serial No. 414,688, filed October 11, 1941, now abandoned.

It is the object of the present invention to combat undesirable clotting of blood in living mammals, especially in man.

We have discovered that 3,3'-methylenebis(4-hydroxycoumarin) is an anti-coagulant and is suitable for beneficial administration to man and other mammals. When administered to man or other mammal, either orally or parenterally, it acts after a time to lower the blood prothrombin level and to lengthen the clotting time of the blood, and thus acts in vivo to combat clotting; and its effect lasts for a rather prolonged period of time. If administered in large doses for a number of days the anti-coagulant effect can be made to extend to dilatation of the capillaries, and to hemorrhage.

By reason of this anti-coagulant action, 3,3'-methylenebis(4-hydroxycoumarin) has many uses, both for prophylaxis and treatment, in blood-circulatory and vascular disturbances, including thrombosis, especially post-operative thrombosis, embolism, phlebitis, Buerger's disease, etc. The exploration of the extent of its uses is still far from complete; but in general it seems to be beneficial where heparin is beneficial, and to have the added advantages of oral administrability, prolonged action, and comparative cheapness.

It has been known for nearly twenty years that sweet clover hay or silage sometimes causes a hemorrhagic disease, especially in cattle but experimentally in other animals, such as rabbits, frequently resulting in death from either internal or external hemorrhage. The fresh sweet clover plant, and properly cured and unspoiled sweet clover hay or silage, do not cause this hemorrhagic disease; but spoiled sweet clover hay and silage may cause it. This disease is known in veterinary practice as "sweet clover disease." So far as we know, prior to our invention it has been caused only by eating of spoiled hay or silage made from the common sweet clover Melilotus alba and Melilotus officinalis, or of certain very crude concentrates obtained from such spoiled hay but wholly unsuitable for administration to man.

Neither this spoiled sweet clover hay nor anything hitherto derived from it is suitable for administration to man. Our anti-coagulant, whether so derived (for that derivation is possible) or otherwise prepared, is suitable for such administration.

Throughout the period since the sweet clover disease was first observed, substantially simultaneously by Schofield in Canada and by Roderick in North Dakota, much research work has been done in attempting to produce a precise causative agent for it, but without success until now.

We have now found that we can produce in pure form from spoiled sweet clover hay an anti-coagulant which will cause this sweet clover disease at will, in cattle and in experimental animals such as rabbits, with an effectiveness about 30,000 times as great as that of the most highly effective spoiled sweet clover hay of which we know. This pure anti-coagulant is 3,3'-methylenebis(4-hydroxycoumarin), which has both the enol form indicated by that name and the keto form 3,3'-methylenebis(2,4-diketochroman), and which melts without decomposition at 288–289° C. Save where the context otherwise requires, we shall include both desmotropes—the enol form and the keto form—under the name 3,3'-methylenebis(4-hydroxycoumarin).

The formulas of the two forms of this product are as follows:

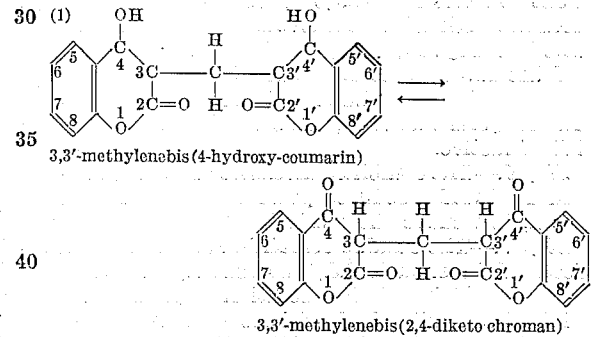

(1) 3,3'-methylenebis(4-hydroxy-coumarin)

3,3'-methylenebis(2,4-diketo chroman)

This new anti-coagulant may be produced from spoiled sweet clover hay, either Melilotus alba or Melilotus officinalis, as follows:

The spoilage of sweet clover hay, to make it hemorrhagic, is commonly produced when green sweet clover is put in a stack or mow while damp and allowed to cure under those conditions. (Smith & Brink, J. Agric. Research, vol. 57, p. 145, 1938.) It is frequently so produced accidentally, but may be produced artificially. This spoiled sweet clover hay is milled (ground or cut) to a fairly fine state.

Then one suitable procedure is as follows:

*Step 1.*—Three kilograms of the milled hay is extracted with a light petroleum fraction, such for instance as n-pentane (Skellysolve A), for about 24 hours, conveniently in a Soxhlet extractor. The solvent is separated from the residue; and such residue is dried, as by allowing the residual solvent to evaporate at room temperature.

*Step 2.*—The residue of extracted hay from step 1 is steeped for about 48 hours at about 25–30° C. in about 30 liters of acidulated water, conveniently made acid with hydrochloric acid, with occasional shaking. The acidity is desirably maintained at about pH 1–2. Then the steep-water is removed, as by filtration, leaving a wet filter cake.

*Step 3.*—The wet filter cake from step 2 is steeped for about 48 hours at about 25–30° C. in about 30 liters of alkaline water, conveniently made alkaline with sodium hydroxide, with occasional shaking. The alkalinity is desirably maintained at about pH 11–12, anyhow above pH 9. During this alkaline steeping an extensive swelling and disintegration of the sweet clover tissue occurs; and various things dissolve, in the form of sodium salts, such as the pectins, hemicelluloses, gums, and water-insoluble acids, and also the anti-coagulant activity. The alkaline solution thus obtained may be separated from the residual and now substantially inactive sweet clover tissue, as by filtering or centrifuging; but that separation need not be done.

*Step 4.*—This alkaline solution, whether or not it is separated from the residual solid fibrous material, is then acidified to about pH 3.0, as by adding hydrochloric acid. This acidification precipitates pectins, hemicelluloses, gums, and water-insoluble acids, and also the anti-coagulant activity; on the surface of the suspended fibers if they are present. The acidified suspension is allowed to stand for several hours, to allow the acid to diffuse into the fibrous material if it is present; and then the whole is filtered. The anti-coagulant activity is in the precipitated material, collected on the filter; and the filtrate is substantially inactive.

*Step 5.*—This material collected on the filter is leached for about 48 hours at about 25–30° C. with about 20 liters of 90–95% ethyl alcohol; and the alcoholic extract is removed, as by filtration. This leaching may be repeated one or more times, and the several alcoholic extracts are combined. The combined alcoholic extract contains the anti-coagulant activity. The residue is substantially inactive.

*Step 6.*—The combined alcoholic extract is concentrated under reduced pressure at about 25 to 30° C., to remove the alcohol.

*Step 7.*—The residue remaining from step 6 is dissolved in enough 0.5% sodium hydroxide to take it up. The alkaline solution so produced is acidified by adding hydrochloric acid until about pH 3 is reached. This acidification produces a brownish-green flocculent precipitate, which settles out in about 12 hours and contains the anti-coagulant activity. This precipitate is separated, as by decanting or filtering; and is sucked fairly dry, as on the filter mat. The filtrate is substantially inactive.

*Step 8.*—The precipitate separated in step 7 is removed from the filter mat, and taken up in about a liter of methyl alcohol; and about 3 liters of ether is then added. This produces a large flocculent precipitate; which is removed, as by filtration. The precipitate thus obtained is substantially inactive; and the filtrate contains the anti-coagulant activity.

*Step 9.*—The filtrate from step 8 is concentrated under reduced pressure at about 25–30 C., to remove volatile solvents. The solid residue then remaining is dissolved in about a liter of 0.5% sodium hydroxide; and the solution is then acidified to about pH 3.0, as with hydrochloric acid, to produce a precipitate, which this time is in a finely divided condition. This precipitate is conveniently not separated from the mother liquor, but remains in suspension. This suspension is shaken with about an equal amount of ethyl ether, which extracts a large part of the anti-coagulant activity. The ether layer is separated from the aqueous layer, which latter contains the insoluble material including some residual anti-coagulant activity. This separated aqueous layer is made strongly alkaline, as by adding more sodium hydroxide; then again made acid to about pH 3.0, as by adding hydrochloric acid; and then again shaken with an equal volume of ether; and the ether layer is separated. This may be repeated as many times as desired, but usually three or four times is sufficient to make the aqueous layer substantially inactive. The several ether layers are combined, usually to make about 3 to 4 liters, and contain substantially the whole of the anti-coagulant activity. This ether solution has a blue-green color.

The ether may be removed under reduced pressure at about 25–30° C., in which case a dark, amorphous, sticky concentrate (ordinarily weighing about 15 to 18 grams) is obtained.

This dark, amorphous, sticky concentrate represents about a 200-fold concentration, by weight, in comparison with the original spoiled sweet clover hay, with but relatively small loss of the total anti-coagulant activity. But it is still not suitable for administration to man for therapeutic effect; for it contains many other compounds besides its anti-coagulant activity. These include ether-soluble, water-insoluble, acidic compounds such as chlorophyll-degradation products, fatty acids, phenolic compounds, organic acids, etc. These other compounds undoubtedly constitute over 99% of it, and make it at least potentially capable of producing fever and sensitivity reactions, especially on parenteral administration.

*Step 10.*—Instead of concentrating the blue-green ether solution obtained in step 9, that ether solution may be and desirably is treated further, to get vastly increased concentration and purification, and to make the product definitely suitable for both oral and parenteral administration to man with no substantial danger of producing either fever or sensitivity reactions. In that further treatment, the ether solution is first shaken in a separatory funnel with several successive portions, usually about four, of about 150 ml. each, of concentrated hydrochloric acid; and the successive acid layers, which are highly colored, are separated from the ether and combined. The combined acid layer is desirably shaken with fresh ether (about 150 ml. for each of several shakings) to remove entrained active material, and the ether layers separated. These ether layers are combined with the ether layer from the first shakings. This combined ether solution, now of a light-yellow or olive-green color, contains the bulk of the anti-coagulant activity; while the hydrochloric-acid layers, dark green in color, contain various things, mostly basic in character, such as the phyllo- pyrro-, and rhodo-porphyrins, and are substantially inactive.

*Step 11.*—The combined ether solution from step 10 is evaporated to dryness, desirably under reduced pressure at about 25–28° C. and in an atmosphere of nitrogen or carbon dioxide for at least the last quarter of the distillation. The solid residue then remaining is taken up in about 10 ml. of benzene; which dissolves all except a relatively inactive, dark, gummy residue.

*Step 12.*—The benzene solution of step 11 is diluted with about 25 volumes of a light petroleum fraction, such as n-pentane (Skellysolve A). This causes a brown solid to separate; and that solid, which is relatively inactive, is suitably removed, as by filtering. The remaining solution is then distilled to dryness under reduced pressure at about 25–30° C. If desired, the active residue thus obtained may again be taken up in about 10 ml. of benzene, and step 12 is repeated, to leave an active residue.

*Step 13.*—The dry residue from step 12 is dissolved in about 200 ml. of 0.5% sodium hydroxide; and the resultant solution is shaken carefully with about an equal volume of ethyl ether, and the ether layer separated. This may be repeated with several successive portions of ethyl ether. The anti-coagulant activity remains in the alkaline aqueous solution, and the ether layers are substantially inactive.

*Step 14.*—The alkaline aqueous solution from step 13 is acidified in dilute hydrochloric acid; which produces a cloudiness. The solid matter of this cloudiness is separated by shaking the suspension with ethyl ether in a separatory funnel. The ether layer contains substantially all the anti-coagulant activity, and the acidic aqueous layer is substantially inactive.

*Step 15.*—The ether solution from step 14 is concentrated, desirably under reduced pressure at about room temperature and in an atmosphere of nitrogen or carbon dioxide, to about 1 ml.; and then about 5 ml. of 95% ethyl alcohol, at room temperature, is added. Dense, greenish-yellow crystals form spontaneously at the bottom of the vessel. These crystals are collected by filtration, still at about room temperature; for if cooling is done at this stage certain contaminating fatty acids also separate.

*Step 16.*—The crystals from step 15 are recrystallized several times from a suitable medium, such as cyclohexanone, $\beta,\beta$-dichloroethylether, benzene, acetone, or a benzene-methanol mixture, and desirably from two or more of these in succession.

The yields usually obtained of these crystals, when all sixteen steps are executed carefully and successfully, are about 60 mg. from 3.0 kilograms of hemorrhagic sweet clover hay. This represents about a 50,000-fold concentration, by weight in comparison with the original spoiled sweet clover hay; but there is usually some loss of anti-coagulant activity, to produce an overall yield of about 60% (or sometimes more), based on biological assay which shows the crystals to be about 30,000 times as effective as an anti-coagulant, weight for weight, as is the most effective sweet clover hay of which we known.

The crystals thus obtained are the analytically pure anti-coagulant agent. When thus analytically pure, these crystals, as crystallized from cyclohexanone, take the form of hexagonal prisms. They melt at 288–289° C., without decomposition on melting. They are optically inactive—their optical rotation is $[\alpha]_D^{25}=0^0$ in benzene. They are ash-free on ignition. They show no halide by Bielstein's test, no phosphorus by fusion with mixed potassium nitrate and sodium carbonate, and no nitrogen by Emich's nitrogen test. They are slightly soluble in benzene—about 10 mg. per ml. at 76° C. They are very slightly soluble in acetone and in ethyl ether. In cyclohexanone their solubility is approximately 8 mg. per ml. at 25° C., but very much greater at higher temperatures. They are practically insoluble in water, and but very slightly soluble in the common alcohols, glycols, and aliphatic hydrocarbons. They are relatively soluble in many basic media, both organic and inorganic, with the formation of salts; which are monobasic salts at low alkalinities, and dibasic salts at higher alkalinities. Thus they may be dissolved in dilute alkali-metal (sodium, potassium, or lithium) hydroxide, or in ammonium hydroxide, or in amines, such for instance as methyl amine or monoethanol amine, or in pyridine or quinoline, to form the corresponding salts. They also form salts with the alkaline-earth metals (calcium, magnesium, barium, and strontium), but these are less water-soluble than are the alkalimetal and ammonium salts.

The salts referred to above have the same anti-coagulant action as have the crystals themselves, and like the crystals may be administered by mouth. The more soluble salts, most desirably the sodium salt, may also be administered parenterally in water solution, and provide a medium for such administration; and for this we have found intravenous administration desirable and convenient. But usually we find oral administration, of the crystals themselves, the most convenient way.

As already stated, these crystals are about 30,000 times as effective as an anti-coagulant as is the most badly spoiled sweet clover hay which we have encountered. They may be administered to mammals and to human beings to act effectively in vivo to combat clotting—to lengthen the clotting time and to reduce the prothrombin level. They produce this effect when administered intravenously, and in human beings and at least some mammals, when fed by mouth. They seem to have no effect on the clotting powers of normal blood or plasma in vitro.

We can also obtain our crystals from spoiled sweet clover hay by other extraction procedures. One such extraction procedure, somewhat simpler and shorter than the sixteen-step process outlined above, is rather effective for mass production of the anti-coagulant from spoiled sweet clover hay, and is as follows:

Three kilograms of spoiled sweet clover hay are extracted with 30 liters of water at about pH 3; the residue is steeped for about 24 hours in about 30 liters of about 0.1 normal sodium hydroxide, and the whole then acidified to about pH 3, as by hydrochloric acid, and filtered; and the then remaining residue is extracted with two 20-liter portions of ethyl alcohol, and the two alcohol extracts are combined. This may be repeated with several 3-kilogram batches of the spoiled sweet clover hay, conveniently about three such batches; and the alcoholic extracts from all the batches are combined. This combined alcoholic extract is concentrated to a syrup, desirably under reduced pressure at about 25° C.; and this syrup is dissolved in about 5 liters of 0.5% sodium hydroxide, and the solution then acidified to about pH 3, as with hydrochloric acid. A precipitate forms on this acidification; and this precipitate is collected, and taken up in about 1 liter of methanol. Then about 2 liters of ethyl ether is added, and the whole is filtered. The anti-coagulant activity is in the filtrate, and the solid material caught on the filter is substantially inactive. The methyl alcohol is removed from this filtrate by shaking with about 6 liters of 2% hydrochloric acid, leaving a green ethereal solution containing the anti-coagulant activity. This green ethereal solution is then shaken with concentrated hydrochloric acid, about 36%, in several successive portions of about 300 ml. each, until the acid layer obtained is almost colorless; and during this treatment some additional ether is desirably added to maintain the ether volume above 2 liters. The ether solution is then concentrated to about 500 ml. at atmospheric pressure, and then further concentrated to a thin syrup at reduced pressure. Examination of this syrup in polarized light under high magnification shows the presence of microscopic crystals of the anti-coagulant embedded in a matrix of amorphous material.

To remove this amorphous material, the syrup is suspended, by shaking, in 200 ml. of methanol; and the whole is then centrifuged to produce a separate methanol layer superposed on a small body of thick syrup containing microscopic crystals of the anti-coagulant agent. The methanol layer, which has taken up some of the amorphous material, is removed by decanting, and the remaining syrup is re-suspended, by shaking, in another 200 ml. of methanol, and the operation repeated. By further repetitions a series of methanol washings is obtained; and the series is continued until the methanol washing is only very slightly colored, then leaving a thick syrup, almost a paste, containing the anti-coagulant agent.

This thick syrup is then thoroughly washed with several successive 50 ml. portions of a solution of a light petroleum solvent (Skellysolve A) in methanol, with increasing concentration of the Skellysolve A for the successive washings. This washing is most conveniently done in a centrifuge tube; and the progress of the washing is followed by observing the appearance of the remaining crystals alternately under polarized and normal light until they are seen to be substantially free from the amorphous material. Then these crystals are subjected to recrystallization in a suitable medium, desirably cyclohexanone; to yield first macroscopic crystals of the crude anti-coagulant, and eventually, after several recrystallizations from cyclohexanone, the analytically pure anti-coagulant melting at 288–289° C.

These crystals which we have produced, and which we have shown to be an effective anti-coagulant agent, for a long time defied chemical characterization and identification. But we have now been able to show, by a series of degradation reactions and by synthesis from known compounds, that they are 3,3'-methylenebis(4-hydroxycoumarin), the dicoumarin above referred to, and that they exist in both the enol form indicated by that name and in the keto form 3,3'-methylenebis(2,4-diketochroman) also already referred to. (Formula 1.) We have shown that the chemical, physical, and physiological properties, and especially the anti-coagulant activity, of the crystals we produced from spoiled sweet clover hay are identical with those of the synthetic product.

In forming the salts the reaction is with the enol form, to produce either the normal or the acid salt, respectively having the formulas:

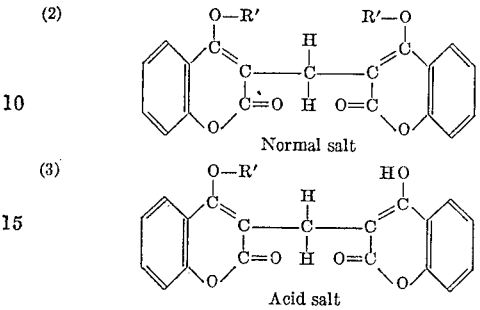

(2) Normal salt
(3) Acid salt in which R' represents a member of the class consisting of an alkali metal, an equivalent of an alkaline-earth metal, ammonium, and substituted ammonium.

The acid salt has both enol and keto forms, represented by the following formula:

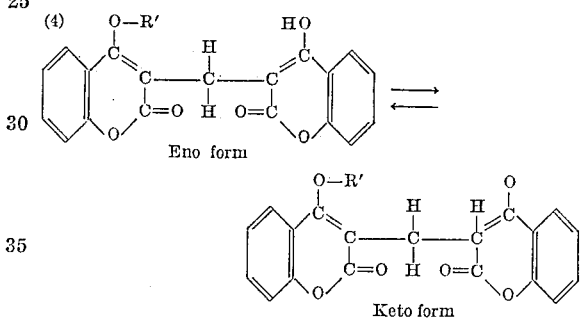

(4) Enol form
Keto form in which R' has the same meaning as given above.

Our 3,3'-methylenebis(4-hydroxycoumarin) is not identical with any of the 60 or more coumarin derivatives which hitherto have been produced from various species of plants—including some from the Melilotus family.

In 1903, Anschütz (Ber. Chem. Ges., vol. 36, p. 465, 1903; Ann. Chem., vol. 367, p. 169, 1909) reported a synthetic product which he called α-methylenebis-β-oxycoumarin or α-methylenebis - benzotetronsäure(α-methylene-bis-benzotetronic acid). That might appear to have the same chemical structure as our 3,3'-methylenebis(4-hydroxycoumarin). But Anschütz said that his product melted at 260° C., and that it decomposed when it melted; while our product melts at 288–289° C., and it does not decompose when it melts. So far as we know, the Anschütz product, whatever it was, was never used for any purpose, but was a scientific curiosity apparently produced only once. Certainly no one ever suggested that it was an anti-coagulant, or knows whether or not it could have been so used.

Our 3,3' - methylenebis(4-hydroxycoumarin), on the contrary, is a most effective anti-coagulant. It is the first one, so far as we know, which is effective when administered by mouth. Indeed, it is most conveniently administered by mouth, in powdered form in capsules; but it may also be effectively administered intravenously, in dilute water solution of its salts. The optimum dosages are not yet determined. Single oral doses as large as 1000 mg. have been given to adult human beings, with no observed deleterious effect. Daily doses of 100 to 400 mg. given orally to adult human beings over a period of several days have resulted in marked decreases in prothrombin level and increases in clotting time. These effects usually do not markedly develop until 12 to 48 hours after the first dose, and continue with gradual diminution for a number of days, and sometimes for two or three weeks, after the administration is discontinued. No significant harmful side effects have so far been noted, under careful observation, on or after administration. These included observations of the hemoglobin, erythrocytes, leukocytes, platelets, liver function, serum bilirubin, serum calcium, and fragility of the erythrocytes. No albumin, pus, or erythrocytes were found in the urine. Although in one case (out of six) a temporary glysouria developed two days after the administration of our product was discontinued, and lasted for three days, it disappeared well before the anti-coagulant effect disappeared, and may well have been due to other causes; and certainly no permanent glycouria has been observed.

There is danger, however, that continued administration, especially of large doses, will produce hemorrhage. Therefore, care must be taken that the prothrombin level of the blood is not too greatly lowered. If occasion arises, the anti-coagulant effect can be counteracted, at least temporarily, by transfusion of fresh whole blood. In addition, the anti-coagulant effect, and any danger of hemorrhage, disappears wholly in the course of a few weeks, at most, after the administration of the anti-coagulant agent is stopped, with no apparent permanent effect or injury. We have shown this dramatically on rabbits; for some of our assay rabbits have had their prothrombin level (or activity) reduced to 10 per cent, or below, of the normal over 100 times (10 day rest period between assays) without developing either indications of permanent injury, the acquisition of immunity, or increased susceptibility to the anti-coagulant agent. The administration of massive single doses (1.0 gm. to a 2.5 kilo rabbit or 5.0 gm. to an 8 kilo dog) effected a reduction in the prothrombin level (or activity) without producing any observed signs of permanent injury.

Our 3,3'-methylenebis(4-hydroxycoumarin) has been used clinically with good effect in various blood-circulatory and vascular diseases, for it has produced definite improvement. Among the conditions which have been treated and showed improvement are thrombo-angeitis obliterans (even with indications of gangrene), coronary occlusion, and cerebral embolus.

While it is not essential that our 3,3'-methylenebis(4-hydroxycoumarin) be analytically pure in order that it be administered to man, it is desirable that it be administered in as pure a form as is obtainable; and especially desirable that it be substantially free from residual contaminants from spoiled sweet-clover hay, when the product administered is derived from such hay. We prefer the synthetic product, both because it is free from danger of such residual contaminants and because it is cheaply obtainable in large quantities. If it is produced from spoiled sweet clover hay, we do not consider it suitable for human administration if its purity is much less than that obtained at the end of step 13 in our process outlined above.

In determining that the anti-coagulant crystals which we obtain from sweet clover hay are 3,3'-methylenebis(4-hydroxycoumarin) one of the steps was the synthesis of 3,3'-methylenebis(4-hydroxycoumarin) by the reaction of 4-hydroxycoumarin with formaldehyde in boiling ethyl alcohol. This synthesis yielded a product identical in physical and chemical, and physiological action with the crystals obtained from sweet clover hay; and the synthesized compound was proved to be identical with the crystals produced from sweet clover hay by various physical, chemical, and physiological tests.

By this synthesis, it is possible to obtain 3,3'-methylenebis(4-hydroxycoumarin) in substantially pure form in much larger quantities and at relatively little expense, as compared to its production from spoiled sweet clover hay.

While Anschütz reported nearly half a century ago that he prepared a product which he called α-methylenebis-β-oxycoumarin or α-methylenebisbenzotetronsäure (α-methylenebisbenzotetronic acid), which might appear to correspond to our 3,3'-methylenebis(4-hydroxycoumarin), it may be questioned whether he really did so; for he gave wrong melting points not only for this compound but for the homologous 3,3'-ethylidenebis(4-hydroxycoumarin), which he said melted at 165° C. but which in reality melts at 176–178° C. without decomposition, he said that it decomposed on melting whereas in fact 3,3'-methylenebis(4-hydroxycoumarin) does not decompose on melting, and he said that the higher homologous compounds 3,3'-propylidenebis(4-hydroxycoumarin) and 3,3'-butylidenebis(4-hydroxycoumarin) could not be made by the reaction of 4-hydroxycoumarin with propionaldehyde and butyraldehyde respectively whereas in fact they can be so made. In any case, it was not known, by Anschütz or anyone else prior to us, that either 3,3'-methylenebis(4-hydroxycoumarin) or any homologous compound is an anti-coagulant.

Our 3,3'-methylenebis(4-hydroxycoumarin) can be made synthetically by reacting 4-hydroxycoumarin with formaldehyde in boiling ethyl alcohol or boiling dioxan; usually with one or more crystallizations, ordinarily from cyclohexanone although other solvents may be used. While the keto form is probably involved in the reaction, the overall reaction is sufficiently indicated by the following equation:

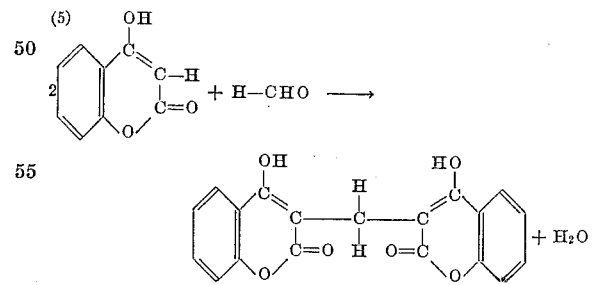

As has already been stated, this 3,3'-methylenebis(4-hydroxycoumarin) forms salts, both normal salts and acid salts, in which the metal is an alkali metal, an equivalent of an alkaline-earth metal, ammonium, or substituted ammonium. These salts may be produced by reaction with alkali-metal hydroxides, alkaline-earth hydroxides, ammonium hydroxide, amines (such for instance as methyl or ethyl or monoethanol amine), and organic bases (such as pyridine and quinoline); but in the case of the alkaline-earth hydroxides it is generally more convenient to form first a solution of an alkali-metal or ammonium salt and then to add the alkaline-earth hydroxide. The salt-forming reaction is with the enol form and the acid salts themselves have both keto and enol forms; as has already been explained.

These salts are also anti-coagulants. In general, the alkali-metal and ammonium salts are more water-soluble than are the parent compounds, but require that the water be on the alkaline side for best solubility. The alkali-metal salts, and most especially the sodium salts, by reason of their greater solubility and also because their toxicity is low, are generally used for intravenous administration, in alkaline-water solution; in which case we desirably keep any excess of alkali as low as possible compatible with putting and keeping the salt in solution. These solutions, in themselves, are relatively unstable, and darken on standing and lose their anti-coagulant activity; so that if no stabilizer is used they should be freshly prepared shortly before administration. But such solutions may be made relatively stable, so that they will keep their anti-coagulant activity for months, by adding a small amount of sodium sulfite.

The salts are difficult to crystallize, and are most easily obtained in amorphous form; but can be obtained, at least in many cases, in crystalline form. The anti-coagulant action is present whether the form is amorphous or crystalline.

We claim as our invention:

1. The process of lowering the blood prothrombin level and lengthening the clotting time of the blood in human beings and thus combating clotting in vivo, which consists in administering to a living human being a substantially pure coumarin compound of the class consisting of 3,3'-methylenebis(4-hydroxycoumarin) and its alkali metal, alkaline-earth metal, ammonium, and substituted ammonium salts, and regulating the amount of such coumarin so administered to avoid too great a lowering of the blood prothrombin level and to prevent hemorrhage.

2. The process of lowering the blood prothrombin level and lengthening the clotting time of the blood in human beings and thus combating clotting in vivo, which consists in administering substantially pure 3,3'-methylenebis(4-hydroxycoumarin) to a living human being; and regulating the amount of such coumarin so administered to avoid too great a lowering of the blood prothrombin level and to prevent hemorrhage.

3. The process of lowering the blood prothrombin level and lengthening the clotting time of the blood in human beings and thus combating clotting in vivo, as set forth in claim 1, in which the substantially pure coumarin compound is administered orally.

4. The process of lowering the blood prothrombin level and lengthening the clotting time of the blood in human beings and thus combating clotting in vivo, as set forth in claim 1, in which the administration is repeated at intervals, and the regulation of the quantity of the substantially pure coumarin compound administered at later intervals is based on the blood prothrombin level following administration at earlier intervals.

5. The process of lowering the blood prothrombin level and lengthening the clotting time of the blood in human beings and thus combating clotting in vivo, as set forth in claim 1, in which the substantially pure coumarin compound is administered in the form of an alkali metal salt and the administration is intravenous.

6. The process of lowering the blood prothrombin level and lengthening the clotting time of the blood in human beings and thus combating clotting in vivo, as set forth in claim 1, in which the substantially pure coumarin compound is administered in the form of its sodium salt and the administration is intravenous.

HAROLD A. CAMPBELL.
MARK A. STAHMANN.
CHARLES F. HUEBNER.
KARL PAUL LINK.

REFERENCES CITED

The following references are of record in the file of this patent:

Best, Charles, Supplement to Minnesota Medicine, volume 23, January 1940, #1, pages 14-19.